United States Patent Office 3,040,666
Patented June 26, 1962

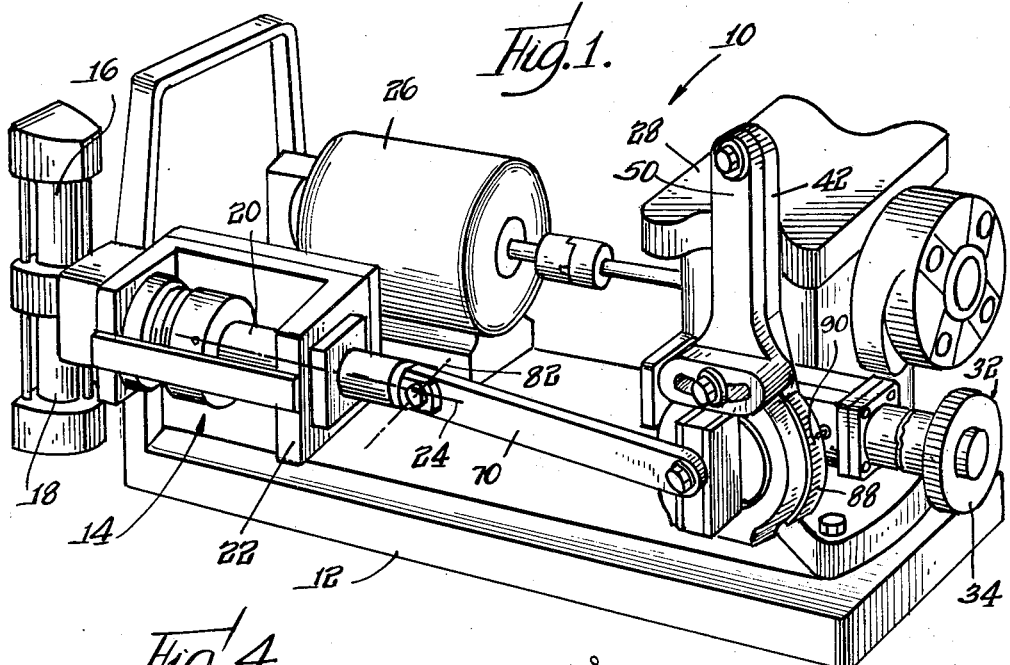
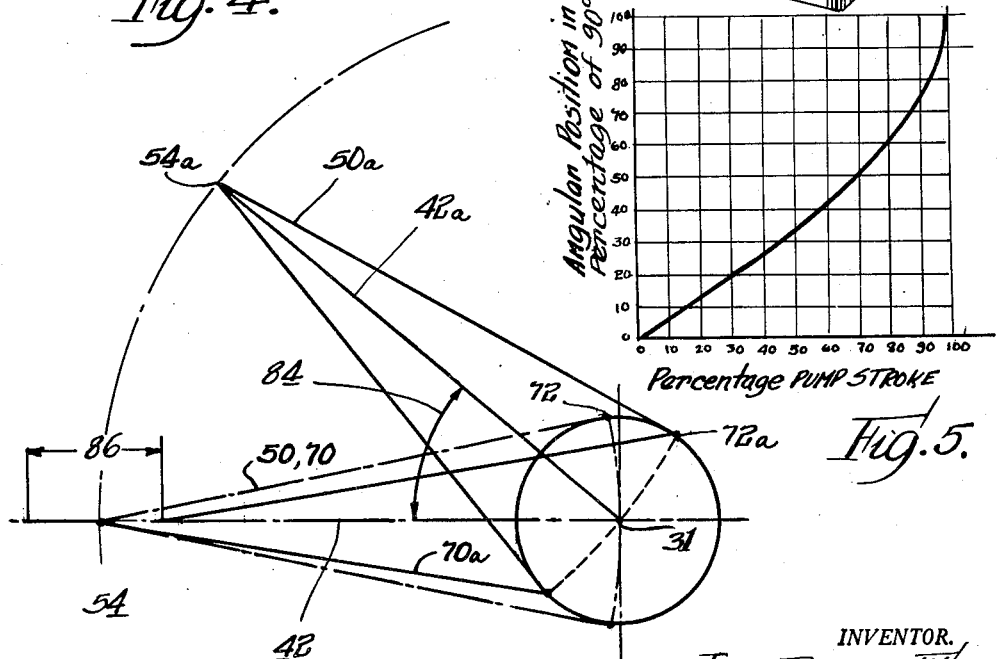
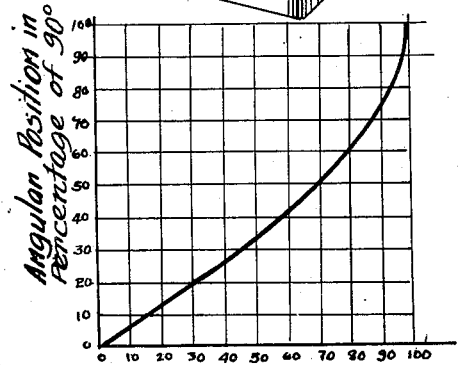
INVENTOR.
Jac Brian Flynn
By: Olson & Trexler
attys.

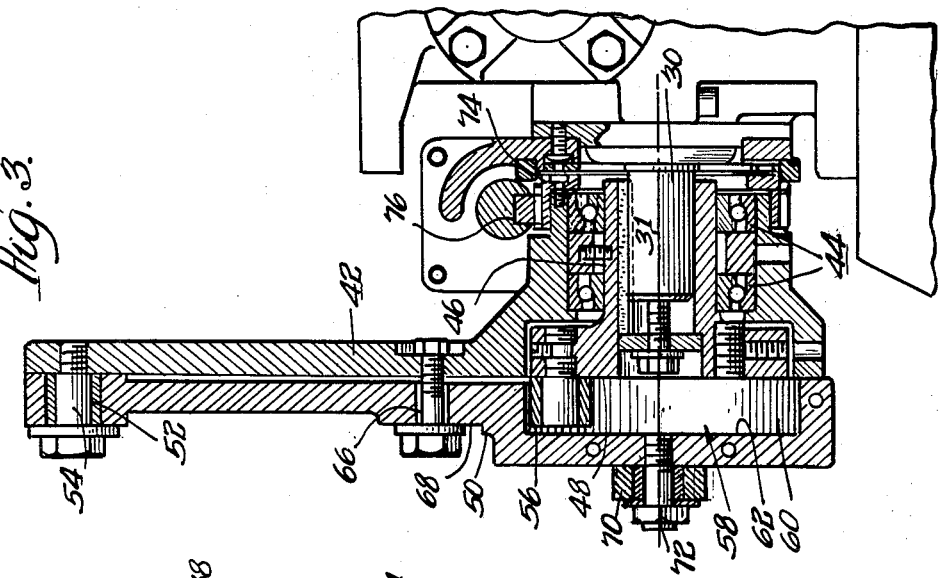
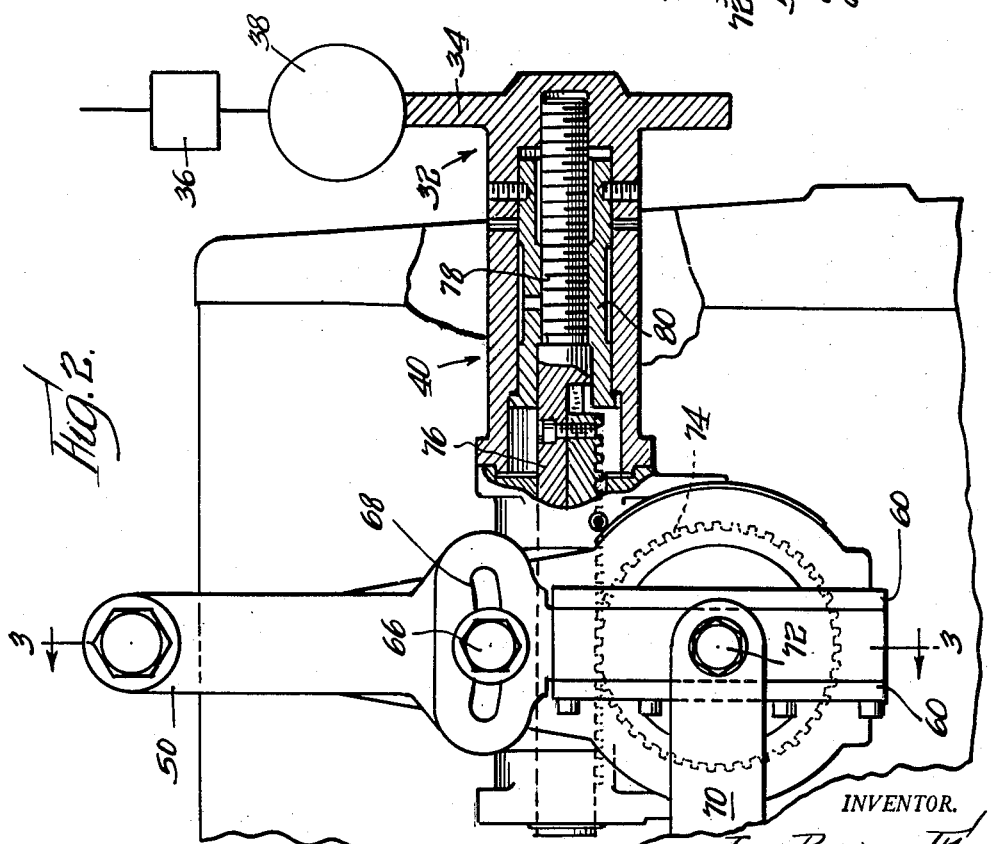

3,040,666
VARIABLE OUTPUT PUMP
Jac B. Flynn, Carpentersville, Ill., assignor to Hills-McCanna Company, Chicago, Ill., a corporation of Illinois
Filed Aug. 24, 1959, Ser. No. 835,470
4 Claims. (Cl. 103—38)

The present invention relates to variable output pumps and more particularly to variable output pumps designed for incorporation into apparatus systems such as those used in the chemical processing field, and other environments which require that fluid be supplied at a variable rate which must conform to changing environmental conditions.

The pumping of fluid in the chemical processing field, for example, is complicated by a number of environmental factors or requirements which have created difficulties in the designing of pumps capable of meeting the operating characteristics desired in this field. In a continuous flow chemical process, it may be necessary to add a reagent at a precise rate to produce the proper concentration or proportion of the reagent in the material involved. Moreover, the conditions under which such chemical processes are carried out are often subject to variation and continuing changes which make it necessary to vary the instantaneous rate at which the reagent is supplied.

The matter of controlling the rate at which a fluid reagent is pumped in chemical processing apparatus is complicated not only by the necessity for varying the pumping rate, but also by the necessity for maintaining an accurate control of the instantaneous pumping rate under fluctuating pressure conditions which can effect either the back pressure on the pump used or the pressure of fluid as supplied to the pump. Even more troublesome complications in the designing of pumps suitable for use in this environment arise from the necessity for avoiding interruptions in the supply of reagent pumped. Thus, any necessity for stopping or interrupting the output of the pump in order to change its output rate could, in many situations, create a highly undesirable disruption of the process being carried out.

Reciprocating pumps, by virtue of their inherent operating characteristics, are particularly well suited for use in chemical processing apparatus and similar environments as discussed above.

An operating characteristic of reciprocating pumps which is highly valued in this field is the ability of such pumps to pump at an accurate predetermined rate which is substantially unaffected by changes in the differential fluid pressure against which the pump operates. Yet, the matter of varying the instantaneous output rate of a reciprocating pump while at the same time maintaining an accurate control of the pump output rate has been a challenging problem, particularly in situations in which it is impractical or undesirable to interrupt the pumping operation to effect changes in the pumping rate. This is especially true where it is desirable to make progressive and continuing variations in the instantaneous output pumping rate. The expedient of varying the output rate of reciprocating pumps by progressively varying the speed of the drive to such pumps is subject to practical shortcomings in that it is difficult to provide a precise control of the pump through driving means that is capable of varying the pump speed progressively throughout a practical speed range, which range should include a zero pumping rate. Moreover, adjustable speed drives suitable for use in this service are characteristically expensive and subject to service problems.

One object of the invention is to provide a variable output reciprocating pump having a new and improved construction adapted to be energized by a constant speed drive and which provides for progressively adjusting the pumping rate while the pump is in operation to provide an accurately controlled pumping rate of any desired value within an output range which extends continuously between and includes a zero pump output and the maximum output capacity of the pump for any driving speed of the pump.

Another object is to provide an improved reciprocating pump, adapted to be energized by a constant speed drive, and having a new and improved construction which provides for progressive adjustment of the displacement of the pump while the pump is in operation, the progressive adjustment of the pumping rate being effected without interrupting the output of the pump.

Another object is to provide a constant speed reciprocating pump in which adjustment of a normally stationary pump control while the pump is in operation serves to progressively vary the displacement and hence the output rate of the pump from zero value to maximum values corresponding to the constant speed at which the pump is driven.

A further object is to provide a constant speed reciprocating pump in which normally stationary control means, which not moved by operation of the pump, can be adjusted while the pump is in operation to progressively change the output rate of the pump to any value within the maximum range of the pump, which value corresponds accurately to the instantaneous position of the normally stationary control means.

Another object is to provide a constant speed reciprocating pump as recited in the preceding objects which has an inherently simple, dependable construction that provides great efficiency in operation, which efficiency is maintained for all output rates of the pump. A related object is to provide an inherently simple and efficient reciprocating pump, as recited above, which avoids lost motion between coacting working parts.

Another object is to provide an adjustable reciprocating pump as recited in the above objects which has an inherently long service life under hard, continuous usage.

Other objects and advantages will be evident from the following description of the exemplary embodiment of the invention illustrated in the drawings, in which:

FIGURE 1 is a perspective view of a variable output constant speed pump embodying the invention;

FIG. 2 is a partially sectioned fragmentary elevational view of the structure appearing at the right end of FIG. 1; together with a diagrammatic illustration of automatic remote control structure for the pump;

FIG. 3 is a vertical sectional view taken generally along the line 3—3 of FIG. 2;

FIG. 4 is a diagrammatic illustration of operation of pump control linkages to vary the displacement in the pump; and FIG. 5 is a graphic illustration of the relationship of the output rate of the pump to the position of an element of the pump control.

Referring to the drawings in greater detail, the constant speed, variable output pump 10 forming the illustrated embodiment of the invention, FIG. 1, is mounted on an elongated base 12. A reciprocating pumping unit 14 mounted on one end of the base 12 is connected through inlet and outlet check valves 16, 18 with suitable supply and discharge conduits (not shown) which interconnect the pumping unit with the chemical processing apparatus, or other fluid system with which the pump is used.

The pumping unit 14 itself is of a well known commercially available construction which need not be specifically described here. Pumping units of this character are sold commercially by the Hills-McCanna Company, Chicago, Illinois. The pumping unit 14 is energized by a reciprocable operating member 20 supported in a frame 22 for translation along a predetermined linear line of motion designated in FIG. 1 by the number 24. The displacement of the pump 14 is a direct linear function of the stroke of the operating member 24.

In operation, the pumping unit 14 is driven at a constant speed by a constant speed drive which preferably comprises a constant speed electric motor 26 connected through a conventional speed reducer 28 to drive an output shaft 30, FIGS. 1 and 3.

The shaft 30 is supported by the speed reducer 28 in a position spaced beyond the outer end of the pump operating member 24 in which the axis 31 of the shaft 30, FIG. 3, intersects the line of motion 24, FIG. 1, of the operating member 20 in perpendicular relation to the latter.

The stroke of the operating member 20 is adjustable during operation of the pump by means of a normally stationary control element 32 which is not moved by operation of the pump. As is shown, the pump control element 32 is shaped to define an annular knob portion 34 adapted to be grasped by an operator and rotated to adjust the output rate of the pump.

Since the control element 32 is not moved by operation of the pump and is stationary except for rotation of the element to effect adjustment of the pump, it is relatively simple matter to control the output rate of the pump automatically in response to changing environmental conditions by means a suitable automatic control unit 36, indicated diagrammatically in FIG. 4, which responds to the critical conditions in which the pump is used and operates through a servo motor 38, also indicated diagrammatically in FIG. 2, to effect rotary adjustment of the control element 32 as necessary to produce the desired output rate of the pump.

The pump control element 32, whether operated manually or through a servo motor or the like, acts through a speed reducing drive 40, to be described presently, to effect rotary adjustment of a pump adjusting element 42 journalled for rotation about the axis 31 of the drive shaft 30 and extending radially outward from the drive shaft, as shown in FIGS. 1 and 3.

Radial support for the pump adjusting element 42 is provided by antifriction bearings 44 supported on the sleeve 46 of a pump driving member 48 connected to the shaft 30.

An oscillating lever 50 is pivotally supported on the pump adjusting member 42 in radially spaced relation to the common axis 31 of the shaft 30 and pump adjusting member 42 and extends inwardly into traversing relation to the outer end of the pump driving member 48, as shown. Thus, the outer end of the oscillating lever 50 is journalled for swinging movement about a pivot stud 52 carried by the outer end of the pump adjusting element 42 and defining a pivotal axis 54 for the oscillating lever.

Oscillation of the lever 50 about its supporting axis 54 is effected by means of an actuator 56, FIG. 3, eccentrically mounted on the driving member 48 and extending axially into engagement with an elongated track or operating groove 58 formed on the driving member end of the oscillating lever in generally parallel relation to a radial line extending therealong from the lever axis 54. Preferably, the actuator groove 58 which receives the eccentric actuator 56 is defined by a pair of straight parallel bearing plates 60, fixed to opposite sides of the inner end of the oscillating lever 50 in embracing relation to an elongated recess 60 in the oscillating lever, which faces toward the driving member 48. The two bearing plates 60 simultaneously engage opposite sides of the actuator 56 to eliminate any lateral play or lost motion of the actuator in the groove 58.

It will be appreciated that rotation of the eccentric actuator 56 in a circular path by means of the drive shaft 30 causes the lever 50 to oscillate through an angular range of movement which is unaffected by changes in the rotary position of the pump adjusting element 42 to swing the oscillating lever axis 54 about the drive shaft axis 31.

Preferably the oscillating inner end of the lever 50 is stabilized by a guide formed in this instance by a threaded element 66 supported on the pump adjusting element 42 and engaging an arcuate bearing surface 68 on the oscillating lever, as shown in FIGS. 2 and 3.

The inner end of the oscillating lever 50 is connected to the outer end of the pump operating member 20 by a connecting rod 70 having a length between the axes of its pivotal connections to the operating member and oscillating lever, respectively, which is equal to the radial spacing between the pivotal connection of the connecting rod and the oscillating lever from the pivotal axis 54 of the oscillating lever. As shown, the connecting rod 70 is connected to the oscillating lever by a pivot stud 72. Moreover, the spacing of the axis of the connecting rod stud 72 from the oscillating lever axis 54 is equal to the radial spacing of the oscillating lever axis 54 from the common axis 31 of the drive shaft 30 and pump adjusting element 42. The significance of these dimensional relationships in controlling operation of the pump will appear presently.

The previously mentioned speed reducing transmission 40 which effects rotary adjustment of the pump adjusting element 42 in response to rotation of the control element 32 comprises a gear 74 non-rotatably fixed to the hub of the pump adjusting element 42 as shown in FIGS. 2 and 3. The gear 74 meshes with a rack 76 which is displaced longitudinally by means of a threaded actuator 78 on one end of the rack, FIG. 2, which extends into an adjusting nut 80 supported against axial displacement and connected for rotation by the previously mentioned control element 32.

The transmission 40 thus provided serves to transform any degree of rotary adjustment of the control element 32 into a corresponding angular adjustment of the pump adjusting element 42 about the axis 31.

Moreover, as will appear from a reference to the diagrammatic illustration in FIG. 4 taken in conjunction with the previous description of the pump structure, the displacement of the pump and hence its output rate are progressively adjustable from a zero value to maximum effective values for the pump by an angular displacement of the pump adjusting element 42 through a 90 degree angular range of movement which includes and extends away from a position of the pump adjusting element 42 in which the pivotal axis 54 of the oscillating lever 50 coincides with the axis 82, FIG. 1, of the pivotal connection of the connecting rod 70 to the pump operating member 20.

Since the effective length of the connecting rod 70 is equal to the radial distance between the pivotal connection of the rod with the oscillating lever 50 from the axis 54 of the oscillating lever, angular adjustment of the control element 42 to bring the oscillating lever axis 54 into coincidence with the pivotal axis 82 of the rod 70 on the operating member 20 reduces the pump displacement and the pumping rate to zero. This follows from the fact that for this angular position of the pump adjusting element 42 both the oscillating lever 50 and the connecting rod 72 oscillate about a common axis, the connecting rod producing no displacement of the pump operating member 20. However, upon angular displacement of the pump adjusting element 42 away from the position in which the axes 54 and 82 coincide, oscillation of the pivotal connection 72 between the connecting rod 70 and the oscillating lever 50 about the axis 54 of the oscillating lever produces a longitudinal reciprocation of the pump operating member 20 which is substantially proportional to the degree of angular displacement of the pump adjusting element 42 away from its initial or zero pumping position through a 90 degree angular range of movement.

The angular displacement of the adjusting element 42 away from its initial or zero pumping rate position is designated in FIG. 4 by the number 84. The corresponding stroke of the pump operating member 20 is designated in FIG. 4 by the number 86. FIG. 4 depicts the two extreme positions of the lever 50 and connecting rod 70 for two angular positions of the adjusting element 42. The extreme positions reached by the moving parts when the adjusting element has been displaced through the angle 84 from its zero pumping position are designated with the reference numbers for the parts with the addition of the suffix "a."

The effective stroke of the operating member 20, and hence the displacement of the pump, is substantially a linear function of the angle 84 for a 90 degree angular range of movement of the pump adjusting element 42. This relationship of the pump displacement to the angular displacement of the pump adjusting element 42 from its zero pumping position is illustrated by the graph in FIG. 5 in which the pump stroke in terms of percentages of its maximum value appears as the abscissa and the angular position of the pump adjusting element in terms of percentages of a 90° displacement from its zero pumping position appears as the ordinate.

The angular position of the pump adjusting element 42 is visually indicated by an arcuate scale 88 on the pump adjusting element, FIG. 1, which is read against a stationary reference mark 90. The scale 88 can be graduated to indicate the angular position of the element 42 in terms of the corresponding values of the pump displacement.

The output rate of the pump 10 just described can be adjusted to any value within its operative range, while the pump is in operation, simply by turning the adjusting element 32, either manually or by means of suitable automatic control structure, as indicated. For all output rates, the pump operates without lost motion to provide a high operating efficiency in pumping at a rate which conforms accurately to the instantaneous position of the pumps adjusting element 32. Moreover, the pump is formed of a sturdy, inherently simple construction and has a long service life under hard, continuous usage.

It will be appreciated that the invention is not necessarily limited to the embodiment illustrated, but includes structural variants within the spirit and scope of the invention as defined by the claims.

The invention is claimed as follows:

1. A variable output reciprocating pump adjustable during operation thereof to vary the output rate of the pump and comprising, in combination, a reciprocating pumping unit including inlet and outlet valves and an operating member supported for translation in opposite directions along a predetermined linear line of motion, a rotatable power shaft mounted in spaced relation to said operating member and cantilevering toward said line of motion for rotation about an axis substantially intersecting said line of motion in generally perpendicular relation thereto, a pump adjusting member mounted for rotation about the axis of said shaft and extending radially therefrom, an oscillating lever pivotally mounted on said adjusting member in radially spaced relation to said shaft axis and extending swingably across the cantilevering end of said shaft, means on the shaft end of said oscillating lever defining an elongated track generally parallel to a radial line extending along said track from the pivotal axis of said lever, an actuator mounted on said shaft in eccentric relation to said shaft axis and cantilevering into engagement with said track to oscillate said lever upon rotation of said shaft, said actuator having a radial spacing from the axis of said shaft such that the diameter of the circle through which the center of said actuator is rotated greatly exceeds the width of said track, a connecting rod pivotally connected at opposite ends to said operating member and to the shaft end of said lever, the pivotal axis of said lever having radial spacings from said shaft axis and from said pivotal connection of said connecting rod to said lever which are individually equal to the length of said connecting rod between its pivotal connections to said operating member and said lever, a gear connected to rotate said adjusting member about said shaft axis, a longitudinally movable rack engaging said gear, and rotatable adjusting means threadably connected to said rack to displace the latter longitudinally upon rotation of said adjusting means to adjust the rotary position of said adjusting member about the axis thereof to vary the stroke of said operating member.

2. A variable output reciprocating pump adjustable during operation thereof to vary the output rate of the pump and comprising, in combination, a reciprocable pumping unit including a translatable operating member, a drive shaft rotatable about an axis disposed in generally perpendicular intersecting relation to an extension of the line of motion of said operating member, a pump adjusting member mounted for rotation about the axis of said shaft and extending radially therefrom, an oscillating lever pivotally mounted on said adjusting member in radially spaced relation to said shaft axis to extend across said shaft axis, means on the shaft end of said oscillating lever defining an elongated track which is shaped and supported by said lever for oscillation across said shaft axis, an actuator mounted on said shaft in eccentric relation to said shaft axis and engaging said track to oscillate said lever upon rotation of said shaft, said actuator having a radial spacing from the axis of said shaft such that the diameter of the circle through which the center of said actuator is rotated greatly exceeds the width of said track, a connecting rod pivotally connected at opposite ends to said operating member and to the shaft end of said lever, the pivotal axis of said lever having radial spacings from said shaft axis and from said pivotal connection of said connecting rod to said lever which are individually equal to the effective length of said connecting rod, a pump control member, and speed reducing means connecting said control member to said adjusting member to rotate the latter to effect adjustments in the stroke of said operating member.

3. A variable output pump adjustable during operation thereof to vary the output rate thereof, comprising, in combination, a reciprocating pumping unit including an operating member therefor mounted for movement in opposite directions along a predetermined path, a rotary driving member mounted for rotaiton about an axis spaced from said operating member, a rotatable pump adjusting element mounted for rotation about the axis of said driving member and extending radially away from said axis, an oscillating element pivotally mounted on said adjusting element in radially spaced relation to said axis to extend across said shaft, a connecting rod pivotally connected between said operating member and the axis end of said oscillating element, the pivotal axis of said oscillating element having spacings from the axis of said driving member and from the pivotal connection of said rod to said oscillating element which are individually equal to the effective length of said rod between the pivotal connections thereof to said operating member and to said oscillating element, a pair of wear plates mounted on the connecting rod end of said oscillating element in spaced parallel relation to each other to define an actuator channel generally parallel to a radial line extending therealong from the pivotal axis of said oscillating element, an actuator mounted on said driving member in eccentric relation to said driving member axis and extending into said actuator channel for oscillating said oscillating element upon rotation of said shaft, said plates having a spacing from each other which defines a channel having a width which is only a fraction of the diameter of the circle through which the center of said actuator is rotated, guide means on said adjusting element coacting with said oscillating element to guide oscillative movement thereof, a speed reducer having an output shaft connected to rotate said driving member, a gear connected to rotate said adjusting element about the rotary axis thereof, a translatable rack coacting with said gear, a longitudinal threaded element connected to said rack, and a rotatable threaded element adapted for manual operation and coacting with said longitudinal threaded element to effect rotary adjustment of said adjusting element to vary the stroke of said operating member.

4. A variable output pump adjustable during operation thereof to vary the output rate thereof, comprising, in combination, a reciprocating pumping unit including an operating element translatable in opposite directions, a driving member mounted for rotation about an axis disposed in generally perpendicular intersecting relation to an extension of the line of motion of said operating element, a rotatable pump adjusting element mounted for rotation about the axis of said driving member, an oscillating element pivotally mounted on said adjusting element in radially spaced relation to said axis to extend across said axis, a connecting rod pivotally connected between said operating element and the axis end of said oscillating element, the pivotal axis of said oscillating element having spacings from the axis of said driving member and from the pivotal connection of said rod to said oscillating element which are individually equal to the effective length of said rod, two channel elements supported on the connecting rod end of said oscillating element and disposed in spaced parallel relation to each other to define an actuator channel generally parallel to a line extending through the pivotal axis of said oscillating element and the axis of the pivotal connection between said connecting rod and said oscillating element, an actuator mounted on said driving member in eccentric relation to said driving member axis and extending into said actuator channel for oscillating said oscillating element upon rotation of said driving member, and adjusting means connected to said pump adjusting element to adjustably rotate the latter to vary the excursion of said operating element.

References Cited in the file of this patent

UNITED STATES PATENTS

| | | |
|---|---|---|
| 2,737,896 | Neyer | Mar. 13, 1956 |
| 2,776,573 | Willi | Jan. 8, 1957 |
| 2,780,404 | Kuehni | Feb. 5, 1957 |
| 2,892,360 | Ill | June 30, 1959 |
| 2,953,029 | Caillaud | Sept. 20, 1960 |

FOREIGN PATENTS

| | | |
|---|---|---|
| 873,057 | France | Mar. 2, 1942 |